(12) United States Patent
Esser et al.

(10) Patent No.: US 11,823,054 B2
(45) Date of Patent: Nov. 21, 2023

(54) LEARNED STEP SIZE QUANTIZATION

(71) Applicant: INTERNATIONAL BUSINESS MACHINES CORPORATION, Armonk, NY (US)

(72) Inventors: Steve Esser, San Jose, CA (US); Jeffrey L. McKinstry, San Jose, CA (US); Deepika Bablani, San Jose, CA (US); Rathinakumar Appuswamy, San Jose, CA (US); Dharmendra S. Modha, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 700 days.

(21) Appl. No.: 16/796,397

(22) Filed: Feb. 20, 2020

(65) Prior Publication Data
US 2021/0264279 A1 Aug. 26, 2021

(51) Int. Cl.
*G06F 17/16* (2006.01)
*G06F 17/10* (2006.01)
(Continued)

(52) U.S. Cl.
CPC ............. *G06N 3/084* (2013.01); *G06F 17/10* (2013.01); *G06F 17/16* (2013.01); *G06N 3/02* (2013.01); *G06N 3/04* (2013.01)

(58) Field of Classification Search
CPC ........... G06N 3/02; G06N 3/04; G06N 3/063; G06N 3/084; G06N 3/082; G06F 17/10; G06F 17/15; G06F 17/153; G06F 17/16
See application file for complete search history.

(56) References Cited

U.S. PATENT DOCUMENTS 10,373,050 B2   8/2019   Lin et al.
2018/0075347 A1 3/2018   Alistarh et al.
(Continued)

FOREIGN PATENT DOCUMENTS

EP   3511872 A1   7/2019

OTHER PUBLICATIONS

Q. Jin, Towards Efficient Training for Neural Network Quantization, arXiv:1912.10207v1 [cs.V] 2019 (Year: 2019).*
(Continued)

*Primary Examiner* — Emily E Larocque
(74) *Attorney, Agent, or Firm* — Erik A. Huestis; Stephen J. Kenny; Foley Hoag LLP

(57) ABSTRACT

Learned step size quantization in artificial neural network is provided. In various embodiments, a system comprises an artificial neural network and a computing node. The artificial neural network comprises: a quantizer having a configurable step size, the quantizer adapted to receive a plurality of input values and quantize the plurality of input values according to the configurable step size to produce a plurality of quantized input values, at least one matrix multiplier configured to receive the plurality of quantized input values from the quantizer and to apply a plurality of weights to the quantized input values to determine a plurality of output values having a first precision, and a multiplier configured to scale the output values to a second precision. The computing node is operatively coupled to the artificial neural network and is configured to: provide training input data to the artificial neural network, and optimize the configurable step size based on a gradient through the quantizer and the training input data.

20 Claims, 8 Drawing Sheets

(51) Int. Cl.
*G06N 3/02* (2006.01)
*G06N 3/084* (2023.01)
*G06N 3/04* (2023.01)

(56) References Cited

U.S. PATENT DOCUMENTS

| | | |
|---|---|---|
| 2018/0232637 A1 | 8/2018 | Caicedo Fernandez et al. |
| 2018/0349758 A1 | 12/2018 | Pan et al. |
| 2019/0122116 A1 | 4/2019 | Choi et al. |
| 2019/0294413 A1 | 9/2019 | Vantrease et al. |
| 2019/0294972 A1 | 9/2019 | Keller et al. |
| 2020/0097818 A1* | 3/2020 | Li .................... G06N 3/084 |
| 2020/0193273 A1* | 6/2020 | Chung ................ G06F 9/54 |
| 2020/0202218 A1* | 6/2020 | Csefalvay ........... G06N 3/06 |

OTHER PUBLICATIONS

S.Wu et al., Training and Inference with Integers in Dep Neural Networks, arXiv:1802.04680v1 [cs.LG], 2018 (Year: 2018).*
S.K. Esser et al., Learned Step Size Quantization, arXiv:1902.08153v3 [cs.LG] 2020 (Year: 2020).*
Louizos et al., "Relaxed Quantization for Discretized Neural Networks," Published as a conference paper at ICLR 2019, 1-15 (2019).

* cited by examiner

LEARNED STEP SIZE QUANTIZATION

This invention was made with government support under FA8750-18-C-0015 awarded by U.S. Air Force, Office of Scientific Research. The government has certain rights to this invention.

BACKGROUND

Embodiments of the present disclosure relate to neural networks, and more specifically, to configuring deep networks.

BRIEF SUMMARY

According to embodiments of the present disclosure neural network systems are provided. In various embodiments, a system comprises an artificial neural network and a computing node. The artificial neural network comprises: a quantizer having a configurable step size, the quantizer adapted to receive a plurality of input values and quantize the plurality of input values according to the configurable step size to produce a plurality of quantized input values, at least one matrix multiplier configured to receive the plurality of quantized input values from the quantizer and to apply a plurality of weights to the quantized input values to determine a plurality of output values having a first precision, and a multiplier configured to scale the output values to a second precision. The computing node is operatively coupled to the artificial neural network and is configured to: provide training input data to the artificial neural network, and optimize the configurable step size based on a gradient through the quantizer and the training input data.

According to embodiments of the present disclosure, methods of and computer program products for operating neural networks are provided. In various embodiments, training input data are provided to an artificial neural network. The artificial neural network comprises: a quantizer having a configurable step size, the quantizer adapted to receive a plurality of input values and quantize the plurality of input values according to the configurable step size to produce a plurality of quantized input values, at least one matrix multiplier configured to receive the plurality of quantized input values from the quantizer and to apply a plurality of weights to the quantized input values to determine a plurality of output values having a first precision, and a multiplier configured to scale the output values to a second precision. The configurable step size is optimized based on a gradient through the quantizer and the training input data.

DETAILED DESCRIPTION

Figure 1:
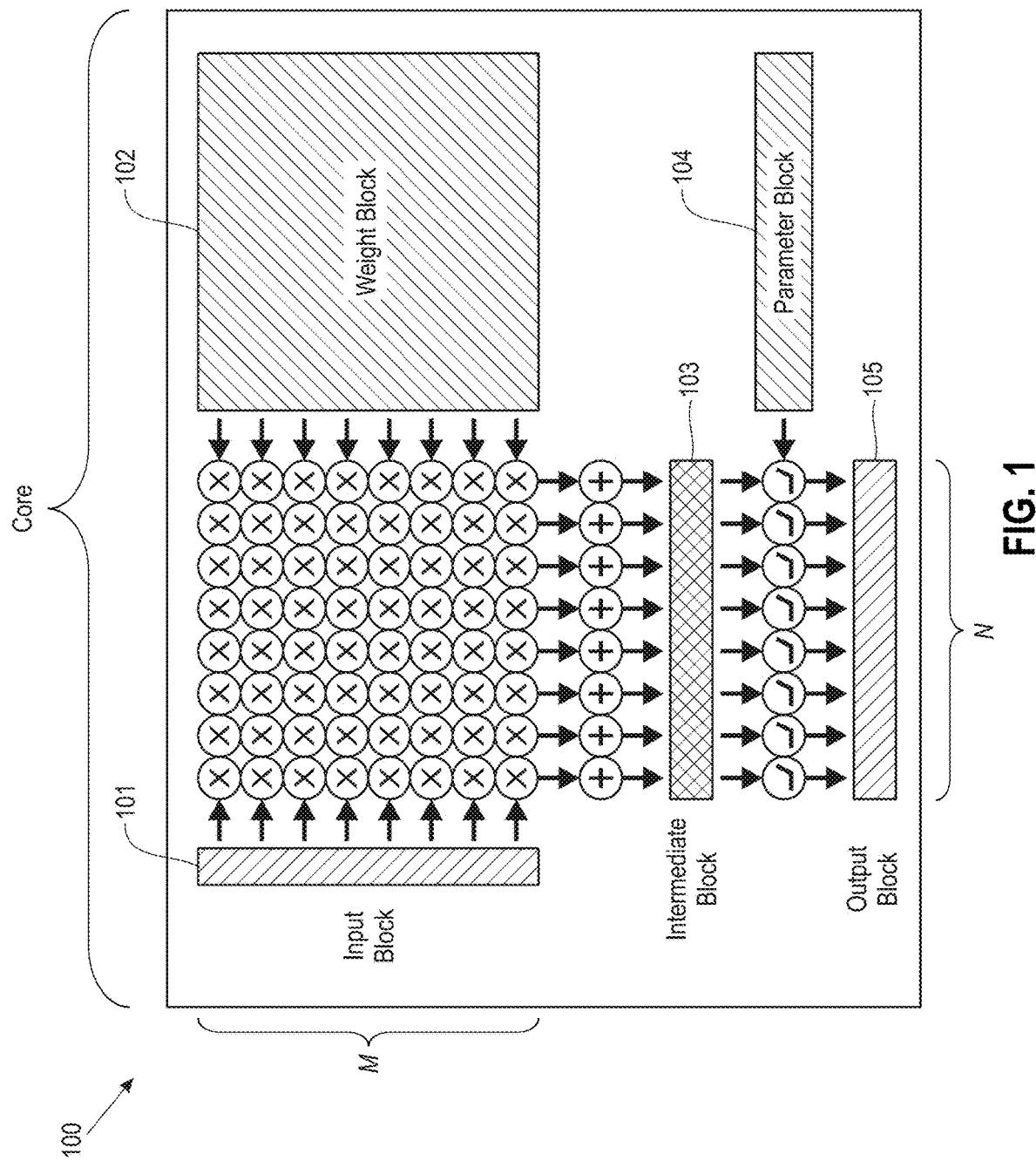
FIG. 1 depicts a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function a.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$y[i, j, k] = \sigma(V[i, j, k, :]; Z[i, j, k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

A deep neural network (DNN) is a neural network with multiple layers between the input and output layers. Deep networks run with low precision operations at inference time offer power and space advantages over high precision alternatives, but need to overcome the challenge of maintaining high accuracy as precision decreases. The DNN finds the correct mathematical manipulation to turn the input into the output, whether it be a linear relationship or a non-linear relationship. The network moves through the layers calculating the probability of each output. Each mathematical manipulation as such is considered a layer, and complex DNN have many layers, hence the name "deep" networks.

Deep networks are useful in a number of technologies, including image recognition, speech recognition, and driving assistance. Unlocking the full promise of such applications requires a system perspective where task performance, throughput, energy-efficiency, and compactness are all critical considerations to be optimized through co-design of algorithms and deployment hardware.

Quantizing weights and activations to lower precision can lead to large reductions in network size and increases in network throughput, both important considerations when deploying deep networks for real world applications. Deep networks are typically run using a 32-bit floating point representation for weight and activations.

However, alternative methods are unable to maintain high task performance while reducing precision, particularly as extremely low precision (<8-bit) networks. Accordingly, it was unknown how to optimally configure the quantizer (determine its step size, also sometimes called its bin width) for each weight and activation layer of a given network to achieve best performance.

Embodiments of the present disclosure apply Equation 3 to quantize weights and activations.

$$\bar{v} = \lfloor \text{clip}(v/s, -Q_N, Q_P) \rceil$$

$$\hat{v} = \bar{v} \times s. \quad \text{Equation 3}$$

v Data (activation or eights)
$\bar{v}$ Quantized data, integer scaled
$\hat{v}$ Quantized data, original scale
s Quantizer step size
$Q_N$ Number of negative states
$Q_P$ Number of positive states In Equation 3, the function clip(z, $r_{min}$; $r_{max}$) returns z with values below $r_{min}$ set to $r_{min}$ and values above $r_{max}$ set to $r_{max}$, and the function [z] rounds z to the nearest integer. Given an encoding with b bits, for unsigned data (activations) $Q_N=0$ and $Q_P=2^b-1$ and for signed data (weights) $Q_N=2^{b-1}$ and $Q_P=2^{b-1}-1$.

For inference, $\bar{w}$ and $\bar{x}$ values can be used as input to low precision integer matrix multiplication units underlying convolution or fully connected layers, and the output of such layers then rescaled by the step size using a relatively low cost high precision scalar-tensor multiplication, a step that can potentially be algebraically merged with other operations such as batch normalization.

Figure 2:
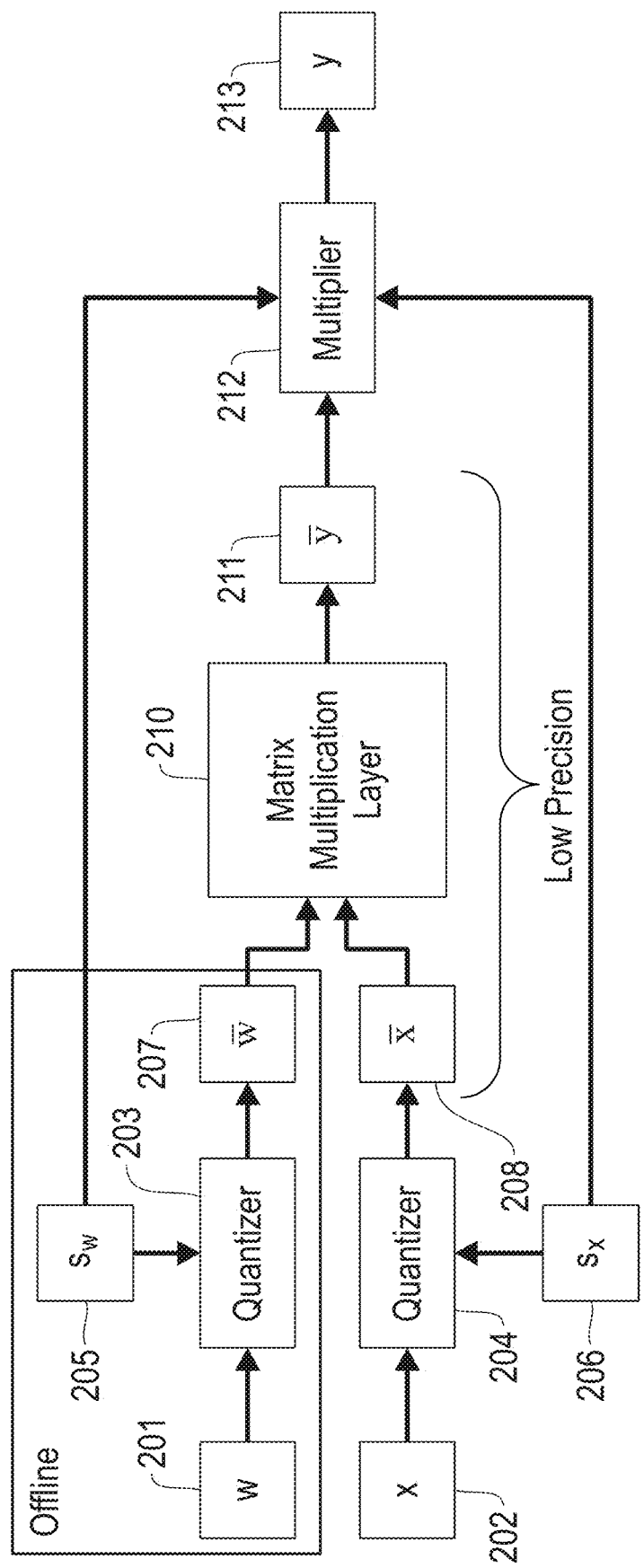
FIG. 2 depicts a data flow for computations involved in a single low precision convolution or fully connected layer.

Equation 3 can be used in the system shown in FIG. 2, which depicts data flow computations involved in a single low precision convolution or fully connected layer. In particular, as shown in FIG. 2, weights 201 and input data 202 are provided to quantizers 203, 204. Weights 201 are quantized according to weight step size 205, and data 202 are quantized according to data step size 206, yielding lower precision weights 207 and input data 208. It will be appreciate for a given network, the weights may be quantized offline, prior to application of the network to input data. Quantized weights and inputs are multiplied by multiplier 210. It will be appreciated that while an exemplary platform for computation of a network layer is provided above, the present disclosure is applicable to a variety of implementations of a neural network. Low precision output 211 are provided to multiplier 212 to obtain full precision outputs 213.

Embodiments of the present disclosure solve the problem of providing a finer representation of the quantizer gradient, which unexpectedly demonstrates better performance than previous means in this space.

In certain aspects, the present disclosure provides embodiments to learn the quantization mapping for each layer in a deep network. Representative embodiments in the present disclosure of learning the quantization mapping for each layer in a deep network include Learned Step Size Quantization (LSQ).

Certain embodiments learn the quantization mapping for each layer including approximating the gradient to the quantizer step size that is sensitive to quantized state transitions. Preferably, a finer grained optimization when learning the step size as a model parameter is provided.

Embodiments to learn the quantization mapping for each layer may include an efficient process to approximate the gradient to the quantizer step size that is sensitive to quantized state transitions, preferably providing for finer grained optimization when learning the step size as a model parameter.

The embodiments of the present disclosure to learn the quantization mapping for each layer may also include a simple heuristic to bring the magnitude of step size updates into better balance with weight updates, which preferably shows improved convergence.

The embodiments of the present disclosure apply to quantizing both activations and weights in network architectures, and are compatible with existing means for backpropagation and stochastic gradient descent. For example, using certain embodiments to train several network architectures on the ImageNet dataset, results in significantly improved accuracy than prior quantization approaches.

In general, during backpropagation, the output of the network is compared to the known correct output. An n error value is calculated for each of the neurons in the output layer. The error gradient values are propagated backwards, starting from the output layer, to determine an error gradient value associated with each neuron. The error gradient values correspond to each neuron's contribution to the network output. The error gradient values are then used to update the weights. By incremental correction in this way, the network output is adjusted to minimize error in response to the training data.

Model quantizers were trained with LSQ by making their step sizes learnable parameters with loss gradient computed using the quantizer gradient described above, while other model parameters were trained using existing techniques. In these procedures, full precision weights are stored and updated, quantized weights and activations are used for forward and backward passes, the gradient through the quantizer round function is computed using the straight through estimator in Equation 4 and stochastic gradient descent is used to update parameters.

$$\frac{\partial \hat{v}}{\partial v} = \begin{cases} 1 & \text{if } -Q_N < v/s < Q_P \\ 0 & \text{otherwise} \end{cases}, \quad \text{Equation 4}$$

For simplicity during training, $\hat{v}$ was used as input to matrix multiplication layers, which is algebraically equivalent to the previously described inference operations. Input activations and weights were set at either 2-, 3-, 4-, or 8-bit for all matrix multiplication layers except the first and last, which always use 8-bit, as making the first and last layers high precision has become standard practice for quantized networks and demonstrated to provide a large benefit to performance. All quantized networks were initialized using weights from a trained full precision model with equivalent architecture before fine-tuning in the quantized space, which improves performance.

In this example, networks were trained with a momentum of 0.9, using a softmax cross entropy loss function, and cosine learning rate decay without restarts. Under the assumption that the optimal solution for 8-bit networks is close to the full precision solution, 8-bit networks were trained for 1 epoch while all other networks were trained for 90 epochs. The initial learning rate was set to 0.1 for full precision networks, 0.01 for 2-, 3-, and 4-bit networks and to 0.001 for 8-bit networks. All experiments were conducted on the ImageNet dataset, using pre-activation, VGG with batch norm, or SqueezeNext. All full precision networks were trained from scratch, except for VGG-16bn, for which was used the pretrained version available in the PyTorch model zoo. Images were resized to 256×256, then a 224×224 crop was selected for training, with horizontal mirroring applied half the time. At test time, a 224×224 centered crop was chosen. LSQ was implemented and tested in PyTorch.

Cosine learning rate decays were used in the experiments as it removes the need to select learning rate schedule hyperparameters, is available in most training frameworks, and does not increase training time. To facilitate comparison with alternative approaches that use step-based learning rate decay, a 2-bit ResNet-18 model was trained with LSQ for 90 epochs, using an initial learning rate of 0.01, which was multiplied by 0.1 every 20 epochs.

It will be appreciated that the above example is provided for the purposes of illustration of one implementation according to the present disclosure, and that alternative configuration configurations may be employed.

In various embodiments of the present disclosure, learning the quantization mapping for each layer includes a first step and a second step.

A first step includes an estimation of quantizer step size gradient. A representative estimation includes computing the gradient through the quantizer to its step size parameter using the following gradient in Equation 5.

$$\frac{\partial \hat{v}}{\partial s} = \begin{cases} -v/s + [v/s] & \text{if } -Q_N < v/s < Q_P \\ -Q_N & \text{if } v/s \leq -Q_N \\ Q_P & \text{if } v/s \geq Q_P \end{cases} \quad \text{Equation 5}$$

$v$ Data(activations or weights)

$\bar{v}$ Quantized data, integer scaled $\hat{v}$ Quantized data, original scale $s$ Quantizer step size $Q_N$ Number of negative states $Q_P$ Number of positive states In some embodiments, this gradient is derived by using the straight through estimator to approximate the gradient through the round function as a pass through operation (though leaving the round itself in place for the purposes of differentiating downstream operations), and differentiating all other operations normally. The gradient scale value is computed by first estimating R (Equation 5), starting with the simple heuristic that for a layer with $N_w$ weights in Equation 6.

$$\|w\|/s \approx \sqrt{N_W Q_P}. \quad \text{Equation 6}$$

To develop this approximation, the expected value of an $l_2$-norm is assumed to grow with the square root of the number of elements normalized. It is assumed that where $Q_P=1$, step size should be approximately equal to average weight magnitude so as to split the weight distribution into zero and non-zero values in a roughly balanced fashion. It is assumed that for larger $Q_P$, step size should be roughly proportional to $$\sqrt{1/Q_P},$$

so that as the number of available quantized states increases, data between the clip points will be quantized more precisely, and the clip points themselves (equal to $sQ_N$ and $sQ_P$) will move further out to better encode outliers.

It is assumed that, in the expectation, $\|\nabla_w L\|$ and $\nabla_s L$ are of approximately the same order. This may be shown by starting from the chain rule in Equation 7.

$$\nabla_s L = \sum_{i=1}^{N_w} \frac{\partial L}{\partial \hat{w}_i} \frac{\partial \hat{w}_i}{\partial s} \qquad \text{Equation 7}$$

Assuming $\partial \hat{w}_i / \partial_s$ is reasonably close to 1, and treating all $\partial L / \partial \hat{w}_i$ as uncorrelated zero-centered random variables, the following expectation across weights may be computed in Equation 8.

$$E[\nabla_s L^2] \approx N_w \times E\left[\frac{\partial L^2}{\partial \hat{w}}\right] \qquad \text{Equation 8}$$

By assuming $\partial \hat{w}/\partial w = 1$ for most weights, Equation 9 is approximated as follows.

$$E[\|\nabla_w L\|^2] \approx N_W \times E\left[\frac{\partial L^2}{\partial \hat{w}}\right] \qquad \text{Equation 9}$$

Bringing all of this together, consequently it can be estimated in Equation 10 as follows.

$$R \approx \sqrt{N_W Q_P}. \qquad \text{Equation 10}$$

Knowing this expected imbalance, the gradient scale factor for weights can be computed by simply taking the inverse of R, so that $$1/\sqrt{N_W Q_P}.$$

As most activation layers are preceded by batch normalization, and assuming updates to the learned batch normalization scaling parameter is the primary driver of changes to pre-quantization activations, a similar approach can be used to the above to show that there is an imbalance between step size updates and update driven changes to activations that grows with the number of features in a layer, $N_F$ as well as $Q_P$. Thus, in some embodiments, the disclosure activation step size is set at $$1/\sqrt{N_W Q_P}.$$

This gradient differs from alternative approximations (e.g., QIL, PACT), which instead either learn a transformation of the data that occurs completely prior to the discretization itself, or estimate the gradient by removing the round operation from the forward equation, algebraically canceling terms, and then differentiating.

In various embodiments of the present disclosure, each layer of weights and each layer of activations has a distinct step size, represented as an fp32 value, initialized to $$2\langle|v|\rangle/\sqrt{Q_P},$$

computed on either the initial weights values or the first batch of activations, respectively.

Figure 3A:
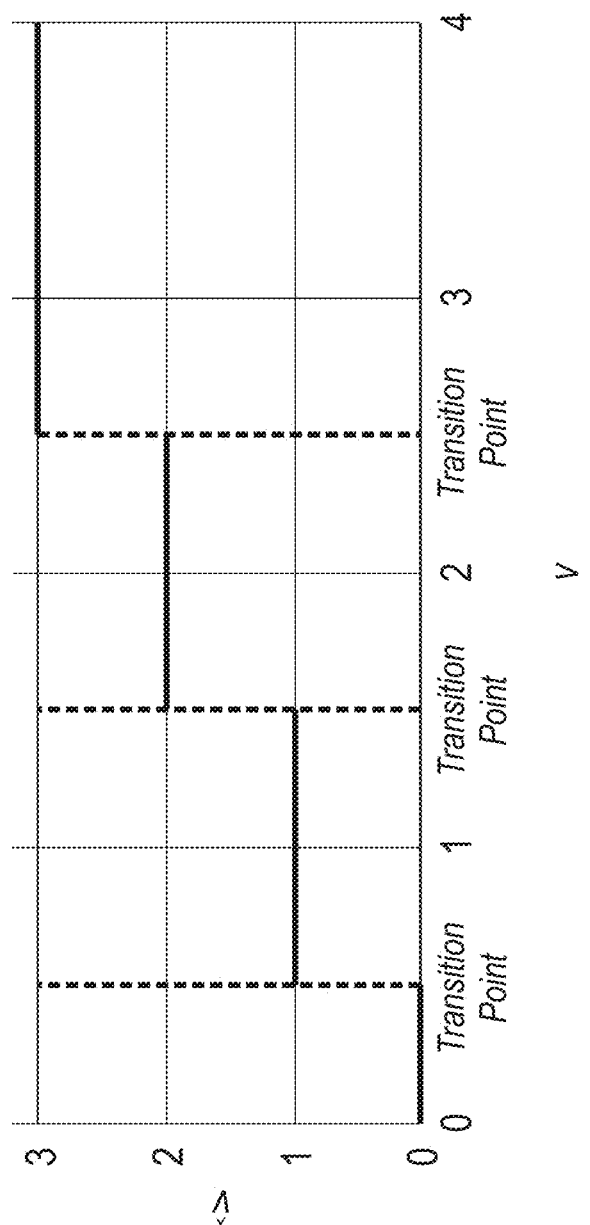
FIG. 3A depicts a quantizer output used in demonstrating the performance of an embodiment of the present disclosure (LSQ).
Figure 3B:
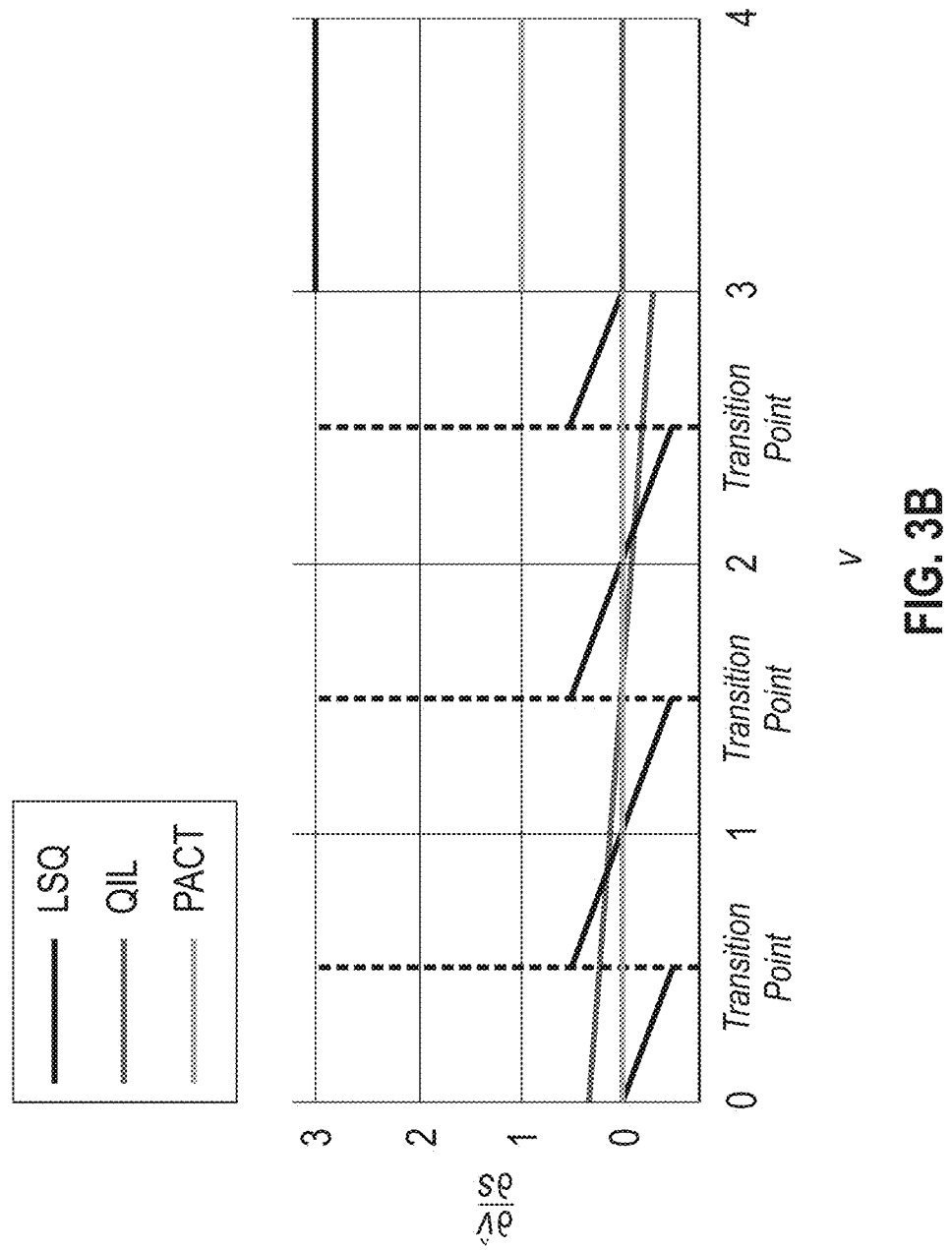
FIG. 3B depicts gradients of the quantizer output for an embodiment of the present disclosure (LSQ), QIL and PACT.

An exemplary embodiment of the present disclosure (LSQ) was compared to two other approaches for learning a quantizer configuration (QIL, PACT). FIG. 3A depicts a quantizer output used in the comparison, while FIG. 3B depicts gradients of the quantizer output for an embodiment of the present disclosure (LSQ), in addition to QIL and PACT. The gradient employed by LSQ is sensitive to the distance between v and each transition point, whereas the gradient employed by QIL is sensitive only to the distance from quantizer clip points, and the gradient employed by PACT is zero everywhere below the clip point. This example demonstrates gradient sensitivity to transition points, while other approaches (QIL, PACT) do not exhibit this feature. Therefore, networks trained with gradients as set out herein reach higher accuracy than those trained with the QIL or PACT gradients.

A second step to learn the quantization mapping includes enhancing the scaling of quantizer step size gradient. This enhancement results from the realization that each step size should also have its update magnitude to parameter magnitude proportioned similarly to that of weights. Good convergence was achieved during training where the ratio of average update magnitude to average parameter magnitude is approximately the same for all weight layers in a network.

In exemplary embodiments of the disclosure, training stability is improved by multiplying step size gradient by Equation 11.

$$1/\sqrt{NQ_P} \qquad \text{Equation 11}$$

Without being bound by theory, the step size parameter is expected to be smaller as precision increases (because the data is quantized more finely), and step size updates are expected to be larger as the number of quantized items increases (because more items are summed across when computing its gradient). To correct for this, various embodiments multiply the step size loss by a gradient scale, g, where for weight step size in Equation 12 and for activation step size in Equation 13. This strategy results in improved trained accuracy. In Equation 11, g is a gradient loss scale, N is $N_W$ for weight step size as presented in Equation 12 and N is $N_F$ for activation step size as presented in Equation 13 below.

$$g = 1/\sqrt{N_W Q_P} \qquad \text{Equation 12}$$

$$g = 1/\sqrt{N_F Q_P} \qquad \text{Equation 13}$$

In exemplary embodiments, each step size has its update magnitude to parameter magnitude proportioned similarly to that of weights. Thus, for a network trained on some loss function L, the ratio for R in Equation 14 should on average preferably be at or close to one.

$$R = \frac{\nabla_s L}{s} \bigg/ \frac{\|\nabla_w L\|}{\|w\|} \qquad \text{Equation 14}$$

Various embodiments of the disclosure function such that all updates are neither so large as to lead to repeated overshooting of local minima, nor so small as to lead to unnecessarily long convergence time.

Additionally, embodiments of the present disclosure optionally learn a solution that does not in fact minimize quantization error.

It was investigated whether reducing model precision will reduce a model's tendency to overfit, and thus also reduce the regularization in the form of weight decay necessary to achieve good performance. For this inquiry, a hyperparameter sweep on weight decay was performed for ResNet-18 (Table 1), and these experiments found that lower precision networks reached higher accuracy with less weight decay. Performance was further improved by reducing weight decay by half for the 3-bit network, and reducing it by a quarter for the 2-bit network. These weight decay values were used for further experiments.

TABLE 1

ResNet-18 top-1 accuracy for various weight decay values

| Weight Decay | 2-bit | 3-bit | 4-bit | 8-bit |
|---|---|---|---|---|
| $10^{-4}$ | 66.9 | 70.1 | 71.0 | 71.1 |
| $0.5 \times 10^{-4}$ | 67.3 | 70.2 | 70.9 | 71.1 |
| $0.25 \times 10^{-4}$ | 67.6 | 70.0 | 70.9 | 71.0 |
| $0.125 \times 10^{-4}$ | 67.4 | 66.9 | 70.8 | 71.0 |

Several networks were trained using an exemplary embodiment of the present disclosure (LSQ) and accuracy was compared with other quantized networks and full precision baselines. To facilitate comparison, models that quantize all convolution and fully connected layer weights and input activations to the specified precision were considered, except for the first and last layers which may use higher precision. Additionally, cosine learning rate decay may be used.

Figure 4:
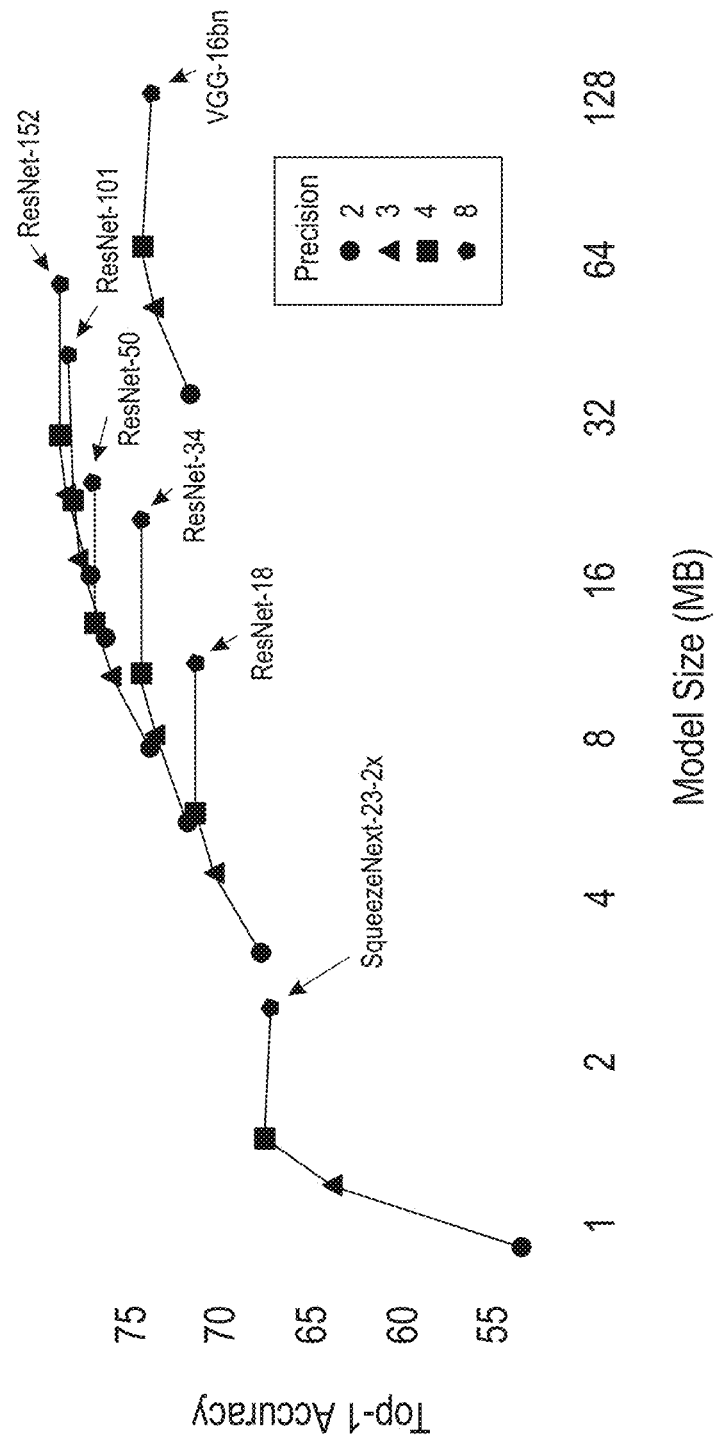
FIG. 4 depicts accuracy vs. model size for network architectures used with an embodiment of the present disclosure (LSQ).

A demonstration of precision using the means of LSQ, QIL, FAQ, LW-Nets, PACT, NICE, Regularization on networks including one or more of ResNet-18, ResNet-34, ResNet-50, Res-Net-101, ResNet-152 and VGG-16bn is presented in Table 2. FIG. 4 is graph of Model Size versus Top-1 Accuracy for an embodiment of the present disclosure used with various networks. For a model size limited application, it is important to choose the highest performing model that fits within available memory limitations. To facilitate this choice, network accuracy is plotted against corresponding model size. Exemplary embodiments of the present disclosure have full precision network accuracy on 3-bit quantized networks.

TABLE 2

| Network | Method | Top-1 Accuracy @ Precision | | | | Top-5 Accuracy @ Precision | | | |
|---|---|---|---|---|---|---|---|---|---|
| | | 2 | 3 | 4 | 8 | 2 | 3 | 4 | 8 |
| | | Full precision: 70.5 | | | | Full precision: 89.6 | | | |
| ResNet-18 | LSQ (Ours) | 67.6 | 70.2 | 71.1 | 71.1 | 87.6 | 89.4 | 90.0 | 90.1 |
| | QIL | 65.7 | 69.2 | 70.1 | | | | | |
| | FAQ | | | 69.8 | 70.0 | | | 89.1 | 89.3 |
| | LQ-Nets | 64.9 | 68.2 | 69.3 | | 85.9 | 87.9 | 88.8 | |
| | PACT | 64.4 | 68.1 | 69.2 | | 85.6 | 88.2 | 89.0 | |
| | NICE | | 67.7 | 69.8 | | | 87.9 | 89.21 | |
| | Regularization | 61.7 | | 67.3 | 68.1 | 84.4 | | 87.9 | 88.2 |
| | | Full precision: 74.1 | | | | Full precision: 91.8 | | | |
| ResNet-34 | LSQ (Ours) | 71.6 | 73.4 | 74.1 | 74.1 | 90.3 | 91.4 | 91.7 | 91.8 |
| | QIL | 70.6 | 73.1 | 73.7 | | | | | |
| | LQ-Nets | 69.8 | 71.9 | | | 89.1 | 90.2 | | |
| | NICE | | 71.7 | 73.5 | | | 90.8 | 91.4 | |
| | FAQ | | | 73.3 | 73.7 | | | 91.3 | 91.6 |
| | | Full precision: 76.9 | | | | Full precision: 93.4 | | | |
| ResNet-50 | LSQ (Ours) | 73.7 | 75.8 | 76.7 | 76.8 | 91.5 | 92.7 | 93.2 | 93.4 |
| | PACT | 72.2 | 75.3 | 76.5 | | 90.5 | 92.6 | 93.2 | |
| | NICE | | 75.1 | 76.5 | | | 92.3 | 93.3 | |
| | FAQ | | | 76.3 | 76.5 | | | 92.9 | 93.1 |
| | LQ-Nets | 71.5 | 74.2 | 75.1 | | 90.3 | 91.6 | 92.4 | |
| | | Full precision: 78.2 | | | | Full precision: 94.1 | | | |
| ResNet-101 | LSQ (Ours) | 76.1 | 77.5 | 78.3 | 78.1 | 92.8 | 93.6 | 94.0 | 94.0 |

TABLE 2-continued

| Network | Method | Top-1 Accuracy @ Precision | | | | Top-5 Accuracy @ Precision | | | |
|---|---|---|---|---|---|---|---|---|---|
| | | 2 | 3 | 4 | 8 | 2 | 3 | 4 | 8 |
| | | Full precision: 78.9 | | | | Full precision: 94.3 | | | |
| ResNert-152 | LSQ (Ours) | 76.9 | 78.2 | 78.5 | 78.5 | 93.2 | 93.9 | 94.1 | 94.2 |
| | FAQ | | | 78.4 | 78.5 | | | 94.1 | 94.1 |
| | | Full precision: 73.4 | | | | Full precision: 91.5 | | | |
| VGG-16bn | LSQ (Ours) | 71.4 | 73.4 | 74.0 | 73.5 | 90.4 | 91.5 | 92.0 | 91.6 |
| | FAQ | | | 73.9 | 73.7 | | | 91.7 | 91.6 |
| | | Full precision: 67.3 | | | | Full precision: 87.8 | | | |
| Squeeze Next-23-2x | LSQ (Ours) | 53.3 | 63.7 | 67.4 | 67.0 | 77.5 | 85.4 | 87.8 | 87.7 |

LSQ achieved a higher top-1 accuracy than alternative approaches for 2-, 3- and 4-bit networks with the architectures in Table 2. For nearly all cases, LSQ also achieved the best-to-date top-5 accuracy on these networks, and best-to-date accuracy on 8-bit versions of these networks. In most cases, no accuracy advantages were found to increasing precision from 4-bit to 8-bit. Other means also significantly increased training time and complexity over our LSQ which fine tunes directly from a full precision model to the precision of interest.

LSQ reached a top-1 accuracy of 67:2, a reduction of 0:4 from the equivalent model trained with cosine learning rate decay, but still marking an improvement of 1:5 over the next best training embodiment of the present disclosure (see Table 2).

When comparing a full precision to a 2-bit precision model, top-1 accuracy drops only 2:9 for ResNet-18, but 14:0 for SqueezeNext-23-2x. One interpretation of this is that the SqueezeNext architecture was designed to maximize performance using as few parameters as possible, which may have placed it at a design point extremely sensitive to reductions in precision.

On a metric of the frontier of best performance for a given model size of the architectures considered here, 2-bit ResNet-34 and ResNet-50 networks offer an absolute advantage over using a smaller network, but with higher precision. Also, at all precisions, VGG-16bn exists below this frontier, as this network does not apply a number of innovations in achieving higher performance with fewer parameters.

Embodiments of the present disclosure demonstrate that in the absence of the gradient scale, a network does not converge without very low learning rate. Such a low learning rate is detrimental to performance.

Figure 5:
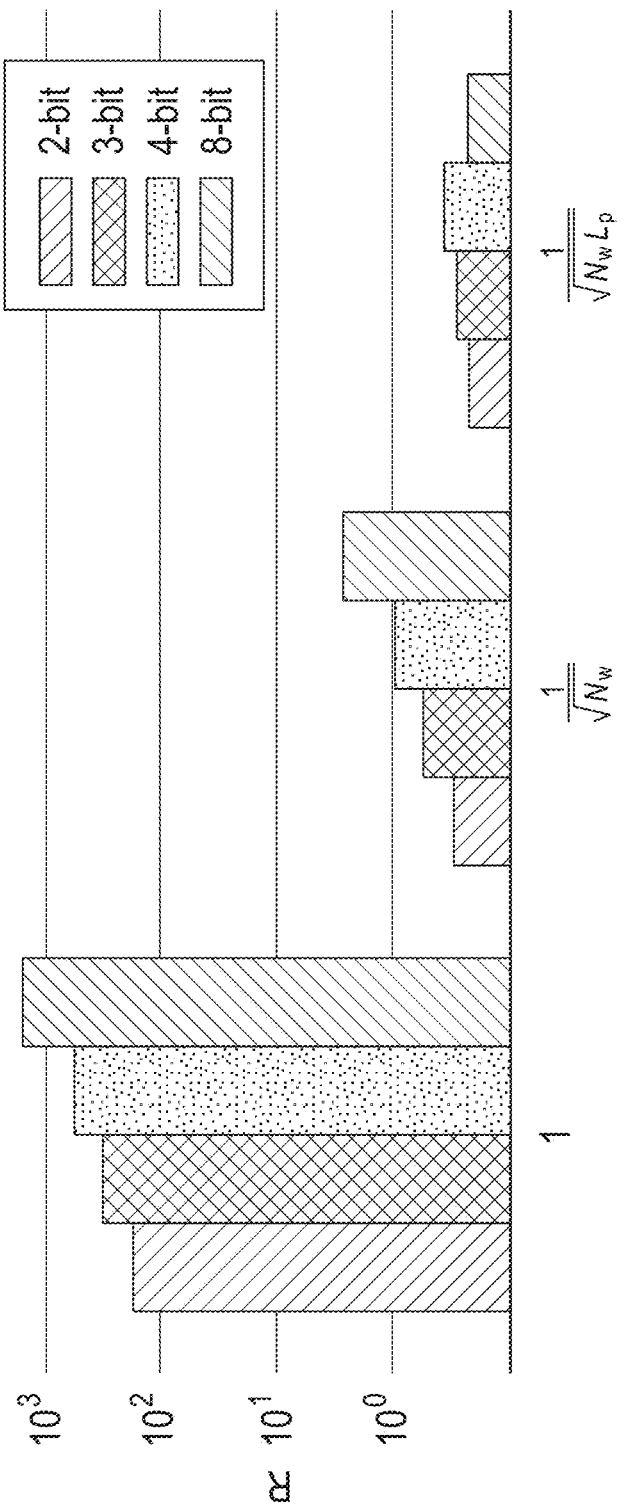
FIG. 5 depicts relative parameter update magnitudes given different step size gradient scales.

Gradient scale as in the embodiments of the present disclosure leads to best performance as compared to further scaling 10×, 1/10×, or scaling by N only as demonstrated in Table 3, which is top-1 accuracy for various gradient scale values and learning rates for 2-bit ResNet-18. FIG. 5 depicts relative parameter update magnitudes given different step size gradient scale.

TABLE 3

| Gradient scale | Learning Rate | Accuracy |
|---|---|---|
| $1/\sqrt{NQ_P}$ | 0.01 | 67.6 |
| $1/\sqrt{N}$ | 0.01 | 67.3 |
| 1 | 0.01 | Did not converge |

TABLE 3-continued

| Gradient scale | Learning Rate | Accuracy |
|---|---|---|
| 1 | 0.0001 | 64.2 |
| $10/\sqrt{NQ_P}$ | 0.01 | 67.4 |
| $1/10\sqrt{NQ_P}$ | 0.01 | 67.3 |

To demonstrate the impact of the step size gradient scale, R was measured averaged across 500 iterations in the middle of the first training epoch for ResNet-18, using different step size gradient scales (the network itself was trained with the scaling as described in the methods to avoid convergence problems). With no scaling, relative to parameter size, updates to step size were 2 to 3 orders of magnitude larger than updates to weights, and this imbalance increased with precision, with the 8-bit network showing almost an order of magnitude greater imbalance than the 2-bit network (FIG. 5, left). Adjusting for population size ($g=1/\sqrt{N_W}$), the imbalance between step size and weights largely went away, through the imbalance across precision remained (FIG. 5, center). Adjusting for population size and precision ($g=1/\sqrt{N_W Q_P}$), this precision dependent imbalance was largely removed as well (FIG. 5, right).

Network accuracy was considered after training a 2-bit ResNet-18 using different step size gradient scales (Table 3). Using the network with the full gradient scale $g=1/\sqrt{NQ_P}$ as baseline, it was found that applying only a population size scale led to a 0.3 decrease in top-1 accuracy, and when no gradient scale was applied the network did not converge unless the initial learning rate was dropped.

Dropping the initial learning rate in multiples of ten, the best top-1 accuracy achieved in this example using no gradient scale was 3:4 below baseline, using an initial learning rate of 0:0001. Finally, it was found that using the full gradient scaling with an additional ten-fold increase or decrease also reduced top-1 accuracy. Overall, this suggests a benefit to the chosen heuristic for scaling the step size loss gradient.

By combining LSQ with same-architecture knowledge distillation (which improves the performance of quantized networks), 3-bit networks were demonstrated that reached the performance of their full precision equivalents (Table 4).

TABLE 4

| | Top-1 Accuracy @ Precision | | | | | Top-5 Accuracy @ Precision | | | | |
|---|---|---|---|---|---|---|---|---|---|---|
| Network | 2 | 3 | 4 | 8 | 32 | 2 | 3 | 4 | 8 | 32 |
| ResNet-18 | 67.9 | 70.6 | 71.2 | 71.1 | 70.5 | 88.1 | 89.7 | 90.1 | 90.1 | 89.6 |
| ResNet-34 | 72.4 | 74.3 | 74.8 | 74.1 | 74.1 | 90.8 | 91.8 | 92.1 | 91.7 | 91.8 |
| ResNet-50 | 74.6 | 76.9 | 77.6 | 76.8 | 76.9 | 92.1 | 93.4 | 93.7 | 93.3 | 93.4 |

To better understand how well low precision networks can reproduce full precision accuracy, LSQ was combined with same-architecture knowledge distillation, which improves low precision network training. Specifically, a distillation loss function was used with temperature of 1 and equal weight given to the standard loss and the distillation loss. In particular, the distillation loss function is described in Hinton, G., Vinyals, O., & Dean, J. (2015). Distilling the knowledge in a neural network. arXiv preprint arXiv: 1503.02531., which is hereby incorporated by reference. The teacher network was a trained full precision model with frozen weights and of the same architecture as the low precision network trained. As shown in Table 4, this improved performance, with top-1 accuracy increasing by up to 1:1 (3-bit ResNet-50), and with 3-bit networks reaching the score of the full precision baseline (see Table 1 for comparison). Using this approach to distill from a full precision teacher to a full precision student network (both with the same architecture), did not lead to an improvement in the student network accuracy beyond training the student alone. These results reinforce that knowledge-distillation can help low precision networks catch up to full precision performance.

Exemplary pseudocode is provided below to facilitate the implementation of LSQ as set out herein. The use of automatic differentiation is assumed, as supported by a number of deep learning frameworks, where the desired operations for the training forward pass are coded, and the automatic differentiation engine computes the gradient through those operations in the backward pass.

The present approach includes two functions with non-standard gradients, gradscale (Function 1) and roundpass (Function 2). An exemplary embodiment implemented the custom gradients by assuming a function called detach that returns its input (unmodified) during the forward pass, and whose gradient during the backward pass is zero (thus detaching itself from the backward graph). This function is used in the form: y=detach($x_1-x_2$)+$x_2$; so that in the forward pass, y=$x_1$ (as the $x_2$ terms cancel out), while in the backward pass, $\partial L/\partial x_1$=0 (as detach blocks gradient propagation to $x_1$) and $\partial L/\partial x_2$=$\partial L/\partial y$. It is also assumed that a function nfeatures that given an activation tensor, returns the number of features in that tensor, and LSQ nweights that given a weight tensor, returns the number of weights in that tensor. Finally, the above are used to implement a function called quantize, which quantizes weights and activations prior to their use in each convolution or fully connected layer.

The pseudocode provided herein is chosen for simplicity of implementation and broad applicability to many training frameworks, though more compute and memory efficient approaches are possible. This example code assumes activations are unsigned, but could be modified to quantize signed activations.

Inset 1
gradscale(x, scale):

```
# x: Input tensor
# scale: Scale gradient by this
yOut = x
yGrad = x × scale
y = detach(yOut − yGrad) + yGrad # Return yOut in forward, pass
gradient to yGrad in backward
return y
```

Inset 2
roundpass(x):

```
# x: Input tensor
yOut = round(x) # Round to nearest
yGrad = X
y = detach(yOut − yGrad) + yGrad # Return yOut in forward, pass
gradient to yGrad in backward
return y
```

Inset 3
quantize(v. s. p, isActivation):

```
# v: Input tensor
# s: Step size, a learnable parameter specific to weight or activation layer
being quantized
# p: Quantization bits of precision
# isActivation: True if v is activation tensor,
# False if v is weight tensor
# Compute configuration values
if isActivation:
 Qn = 0
 Qp = 2^p − 1
 gradScaleFactor = sqrt(nfeatures(v) × Qp)
else: # is weights
 Qn = −2^(p-1)
 Qp = 2^(p-1) − 1
 gradScaleFactor = sqrt(nweights(v) × Qp)
# Quantize
s = gradscale(s, gradScaleFactor)
v = v / s
v = clip(v, Qn, Qp)
vbar = roundpass(v)
vhat = vbar x s
return vhat
```

Embodiments of the present disclosure (LSQ) demonstrate that on the ImageNet dataset across several network architectures, embodiments of the present disclosure (LSQ) exceed the performance of all prior approaches for creating quantized networks. The best performance was found when rescaling the quantizer step size loss gradient based on layer size and precision. LSQ does not appear to minimize quantization error, whether measured using mean square error, mean absolute error, or Kullback-Leibler divergence. One advantage of embodiments of the present disclosure is efficiency of implementation, through addition of an additional parameter per weight or activation layer.

Further, embodiments of the present disclosure are useful in training low precision networks to achieve accuracy equal to their full precision counterparts. In addition, 2-bit solutions are useful in that in certain cases they can give the best accuracy for a given model size, for example, with an 8 MB model size limit, a 2-bit ResNet-50 was better than a 4-bit ResNet-34 (FIG. 4).

The present disclosure significantly advances steadily reducing the number of bits of precision necessary to achieve good performance across a range of network architectures on ImageNet. The embodiments of the present disclosure demonstrate that reducing network precision while maintaining high accuracy is an achievable goal reducing model size and increasing throughput to provide performance advantages in real world deployed deep networks.

Thus, using an embodiment of the present disclosure to train several network architectures on the ImageNet dataset, results in significantly improved accuracy over prior quantization approaches. Unexpectedly, this embodiment of the present disclosure also demonstrated 3-bit networks reaching the performance of their full precision equivalents.

Figure 6:
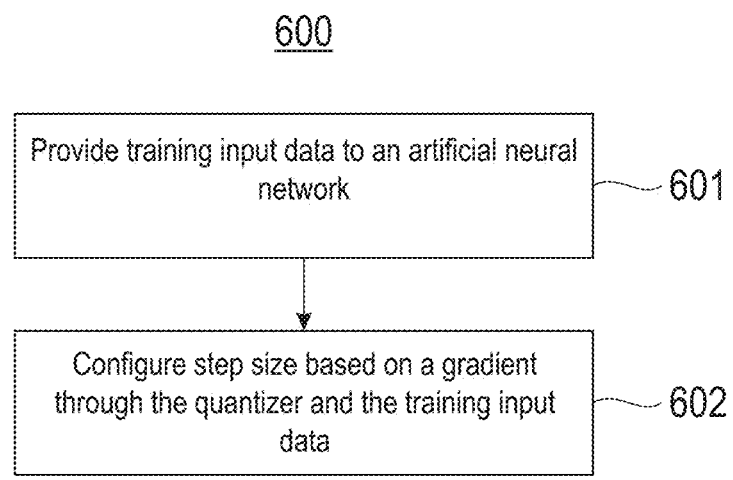
FIG. 6 illustrates a method of learned step size quantization according to embodiments of the present disclosure.

Referring now to FIG. 6, a method of learned step size quantization is provided according to embodiments of the present disclosure. At 601, training input data is provided to an artificial neural network. The artificial neural network comprises: a quantizer having a configurable step size, the quantizer adapted to receive a plurality of input values and quantize the plurality of input values according to the configurable step size to produce a plurality of quantized input values, at least one matrix multiplier configured to receive the plurality of quantized input values from the quantizer and to apply a plurality of weights to the quantized input values to determine a plurality of output values having a first precision, and a multiplier configured to scale the output values to a second precision. At 602, the configurable step size is configured based on a gradient through the quantizer and the training input data.

Figure 7:
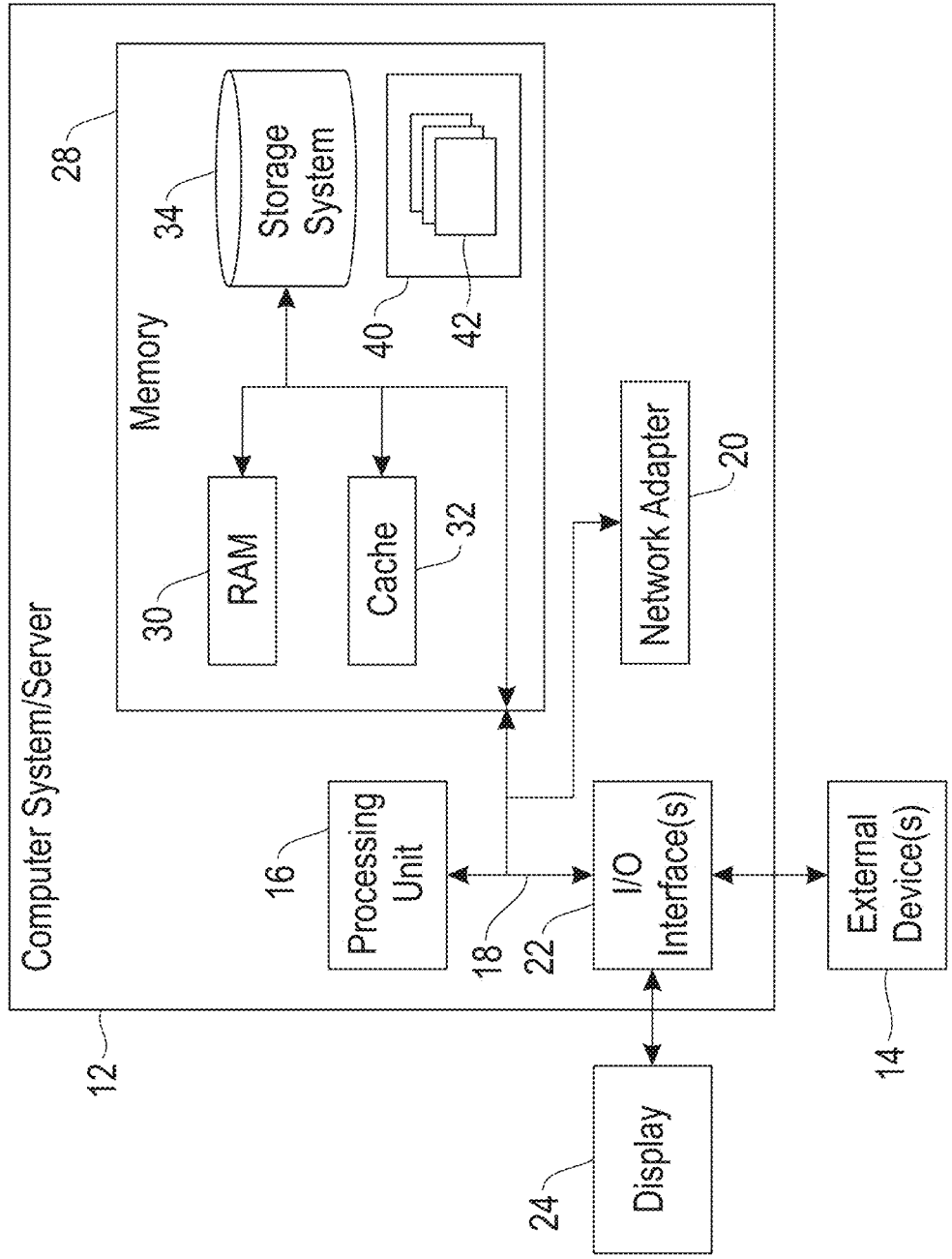
FIG. 7 depicts a schematic of an example of a computing node, such as a computer system/server, that may include or be used with an embodiment of the present disclosure.

Referring now to FIG. 7, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    an artificial neural network comprising
        a quantizer having a configurable step size, the quantizer adapted to receive a plurality of input values and quantize the plurality of input values according to the configurable step size to produce a plurality of quantized input values,
        at least one matrix multiplier configured to receive the plurality of quantized input values from the quantizer and to apply a plurality of weights to the plurality of quantized input values to determine a plurality of output values having a first precision, and
        a multiplier configured to scale the plurality of output values to a second precision, wherein the multiplier includes as inputs the plurality of output values, a weight step size, and a data step size;
    a computing node operatively coupled to the artificial neural network and configured to:
        provide training input data to the artificial neural network, and
        optimize the configurable step size based on a gradient through the quantizer and the training input data.

2. The system of claim 1, wherein the computing node is configured to optimize the configurable step size by backpropagation.

3. The system of claim 2, wherein said backpropagation applies gradient descent.

4. The system of claim 3, the quantizer comprising a round function, the round function being a pass-through function in said backpropagation.

5. The system of claim 1, wherein the gradient is based on a neural network layer size and precision.

6. The system of claim 1, wherein:
    the artificial neural network further comprises a second quantizer, the second quantizer adapted to quantize input weights according to the configurable step size to thereby generate the plurality of weights.

7. The system of claim 1, wherein the quantizer is further configured to quantize input weights according to the configurable step size to thereby generate the plurality of weights.

8. The system of claim 1, wherein the quantizer is operatively connected to one or more activation layer of the artificial neural network.

9. The system of claim 1, wherein the quantizer is operatively connected to one or more weight layer of the artificial neural network.

10. The system of claim 1, wherein the artificial neural network comprises at least one weight layer and at least one activation layer, and wherein the artificial neural network further comprises a quantizer for each weight layer and each activation layer.

11. The system of claim 1, wherein the computing node is further configured to scale the gradient according to a number of features in an activation layer of the artificial neural network.

12. The system of claim 1, wherein the computing node is further configured to scale the gradient according to an inverse of the square root of a number of features in an activation layer of the artificial neural network.

13. The system of claim 1, wherein the computing node is further configured to scale the gradient according to an inverse of the square root of a number of features in an activation layer of the artificial neural network and on an inverse of the square root of a number of quantization levels of the quantizer.

14. The system of claim 1, wherein the computing node is further configured to scale the gradient according to a number of weights in a weight layer of the artificial neural network.

15. The system of claim 1, wherein the computing node is further configured to scale the gradient according to an inverse of the square root of a number of weights in a weight layer of the artificial neural network.

16. The system of claim 1, wherein the computing node is further configured to scale the gradient according to an inverse of the square root of a number of weights in a weight layer of the artificial neural network and the inverse of the square root of a number of quantization levels of the quantizer.

17. A method of training an artificial neural network, the method comprising:
    providing training input data to an artificial neural network, the artificial neural network comprising:
        a quantizer having a configurable step size, the quantizer adapted to receive a plurality of input values and quantize the plurality of input values according to the configurable step size to produce a plurality of quantized input values,
        at least one matrix multiplier configured to receive the plurality of quantized input values from the quantizer and to apply a plurality of weights to the plurality of quantized input values to determine a plurality of output values having a first precision, and
        a multiplier configured to scale the plurality of output values to a second precision, wherein the multiplier includes as inputs the plurality of output values, a weight step size, and a data step size;
    optimizing the configurable step size based on a gradient through the quantizer and the training input data.

18. The method of claim 17, wherein the configurable step size is optimized by backpropagation applying gradient descent, the quantizer comprising a round function, the round function being a pass-through function in said backpropagation.

19. The method of claim 17, wherein the artificial neural network comprises at least one weight layer and at least one activation layer, and wherein the artificial neural network further comprises a quantizer for each weight layer and each activation layer.

20. A computer program product for training an artificial neural network, the computer program product comprising a computer readable storage medium having program instructions embodied therewith, the program instructions executable by a processor to cause the processor to perform a method comprising:

providing training input data to an artificial neural network, the artificial neural network comprising:
- a quantizer having a configurable step size, the quantizer adapted to receive a plurality of input values and quantize the plurality of input values according to the configurable step size to produce a plurality of quantized input values,
- at least one matrix multiplier configured to receive the plurality of quantized input values from the quantizer and to apply a plurality of weights to the plurality of quantized input values to determine a plurality of output values having a first precision, and
- a multiplier configured to scale the plurality of output values to a second precision, wherein the multiplier includes as inputs the plurality of output values, a weight step size, and a data step size;

optimizing the configurable step size based on a gradient through the quantizer and the training input data.

\* \* \* \* \*